United States Patent

[11] 3,589,394

| [72] | Inventor | Oskar Wanka<br>Deggendorf/Danube, Germany |
|---|---|---|
| [21] | Appl. No. | 806,208 |
| [22] | Filed | Mar. 11, 1969 |
| [45] | Patented | June 29, 1971 |
| [73] | Assignee | Deggendorfer Werft und Eisenbau G.m.b.H.<br>Deggendorf/Danube, Germany |
| [32] | Priority | Mar. 17, 1969 |
| [33] | | Germany |
| [31] | | P 16 75 501.4 |

[54] DEVICE FOR DISTRIBUTING FLOW MEDIA OVER SEVERAL PASSAGE OPENINGS
12 Claims, 6 Drawing Figs.

[52] U.S. Cl. .................................................. 137/590
[51] Int. Cl. .................................................. F16l 5/00, B05b 1/16
[50] Field of Search .................................................. 137/608, 561.1, 590; 239/561; 122/438

[56] References Cited
UNITED STATES PATENTS

| 110,753 | 1/1871 | Doyle | 137/608 X |
| 1,390,310 | 9/1921 | Plumer | 239/561 X |
| 3,332,624 | 7/1967 | Rinkewich | 239/561 X |
| 3,348,776 | 10/1967 | Hunter | 239/561 X |

Primary Examiner—M. Cary Nelson
Assistant Examiner—R. B. Rothman
Attorney—McGlew & Toren ABSTRACT: A device for distributing and regulating the flow of a fluid medium is formed by a plate member having a plurality of openings for the passage of the fluid medium. At a location spaced from their entrances, each of the openings has a minimum transverse cross-sectional size, however, the opposite surfaces of the opening between the minimum cross-sectional size and the entrance are varied between parallel and diverging relationship in respect to the pressure of the fluid medium at the entrance to the openings.

INVENTOR.
OSKAR WANKA

DEVICE FOR DISTRIBUTING FLOW MEDIA OVER SEVERAL PASSAGE OPENINGS

SUMMARY OF THE INVENTION

The present invention is directed to a flow distribution device, and, more particularly, it concerns the arrangement of the surfaces of openings through a plate or tube for regulating the flow in relation to the pressure of the fluid medium entering the opening.

In a number of technical fields, such as the power generation industry, the chemical industry and industries related to it, a fluid medium must be distributed in a certain ratio through a number of openings or over tubes disposed in parallel relationship.

This requirement for distributing and regulating a fluid medium is of importance in tubular heat exchangers, reaction columns and nuclear reactors. From the following formula the factors effecting the flow medium can be noted.

$$f = \frac{q}{\mu \cdot \sqrt{2gh}}$$

For if we consider that
$f$ = passage cross section (of an opening or of a tube) in m²
$q$ = flow quantity in n³/sec
$\mu$ = coefficient of total resistance (caused by contraction, friction, impact, etc.
$h$ = pressure head in $m$ of liquid column
$\sqrt{2g} = 4.43$ = constant value,
it appears that a fluid medium can be distributed uniformly through several passages or openings only if at the entrance to these passages or openings, which have the same cross sections and otherwise similar conditions concerning the influence of the coefficient of total resistance, an equal pressure head exists throughout the fluid medium.

In the distribution of a fluid medium, however, it is not always possible to maintain uniform conditions of flow. Unequal pressure conditions may result because of the differences in the flow paths of the fluid medium from its source to the entrances of the openings or passages and also because of differences in the cross sections of the individual openings or passages or different flow resistances in the individual flow paths. For example, such conditions exist in a reactor having a bank of longitudinally extending laterally spaced tubes with a heat exchange medium to be conveyed uniformly over the exterior of the tubes. Normally, in such arrangements, the fluid medium flows first transversely of the tubes and then it flows in the axial direction of the tubes. In such arrangements, distributor plates, positioned adjacent to the ends of the tubes, convey the fluid medium in its transverse flow to openings for passage axially along the exterior of the tubes. In such distributor plates the cross section through the openings have been dimensioned in proportion to the pressure head at the entrances to the openings in an attempt to provide uniform flow over the tubes.

It is the primary object of the present invention to solve the problem of regulating the flow distribution through a plate member or through tubular passageways in a different manner than employed in the past, because it is not always economical and desirable to provide flow passages of different cross sections in order to achieve a uniform or otherwise regulated flow of the fluid medium. The principle feature of the invention is the provision of a minimum transverse cross-sectional size for the openings or passages at a location spaced from their entrances with the surfaces of the openings or passages extending between the location of the minimum size and the entrance distributed in parallel or diverging relationship. The arrangement of the surfaces extending from the entrances is based on the coefficient of total resistance and the pressure head at the entrance to obtain the desired flow distribution.

Therefore, in accordance with the invention, all of the openings or tubular passages are initially of the same size which is particularly advantageous for production reasons. Moreover, the formation of the openings at their entrances can be precisely determined based on the factors determining the coefficient of resistance at the entrance. The magnitude of the coefficient of resistance can be easily determined by calculation or experiment.

Due to the conditions existing at the entrances to the openings, for example, pressure differences in the fluid medium which determines the arrangement of the surfaces of the opening at its entrance, the invention is equally applicable to openings in plugs inserted at the entrance ends of pipes as well as to openings through plates. The shape of the openings can be selected to provide an increasing jet cross section in inverse relationship to the pressure conditions of the fluid medium at the entrance to the openings.

Depending on the flow conditions of the fluid medium sought to be achieved, it may be advantageous to provide different arrangements for the exits from the openings. Further, the friction, which is a part of the coefficient of resistance, can be varied by varying the axial lengths of the openings, such as by inserting sleeves or bushings, or fabric plugs of different lengths and the like.

The various features of novelty which characterize the invention are pointed out with particularity in the claims annexed to and forming a part of this specification. For a better understanding of the invention, its operating advantages and specific objects attained by its uses, reference should be had to the accompanying drawings and descriptive matter in which there are illustrated preferred embodiments of the invention.

DETAILED DESCRIPTION OF THE PREFERRED EMBODIMENTS

Figure 1:
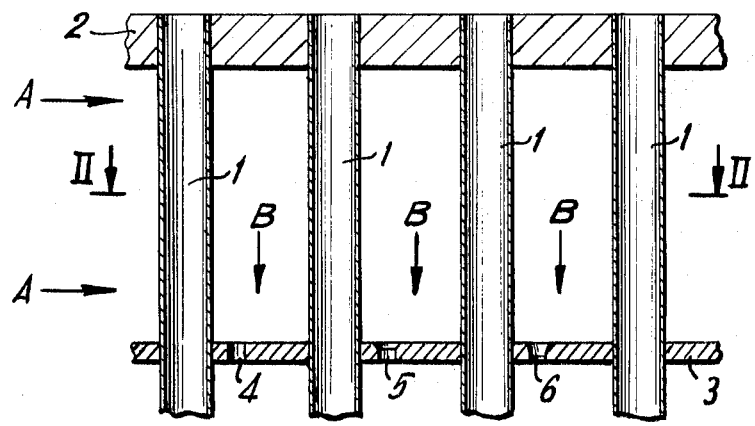
FIG. 1 is a partial longitudinal section of a heat exchanger taken along line I–I in FIG. 2.
Figure 2:
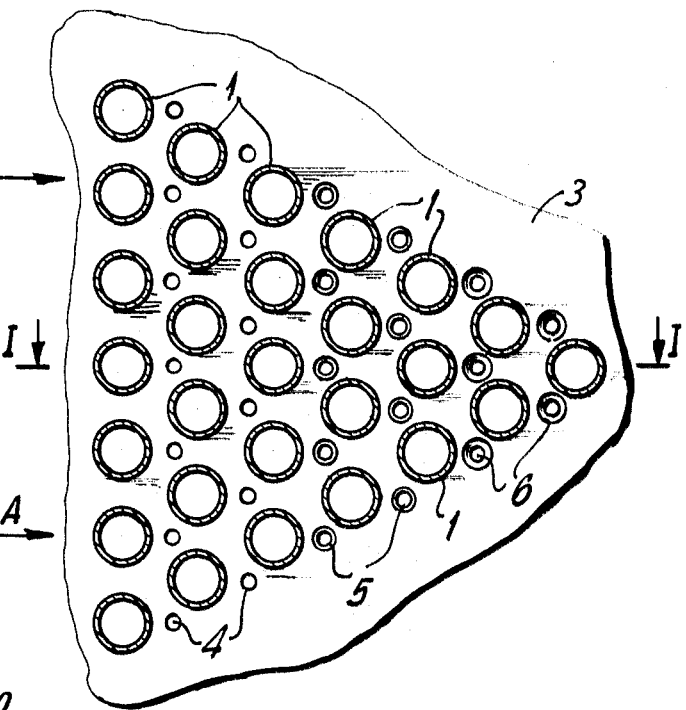
FIG. 2 is an end view taken along the line II–II in FIG. 1.

In FIG. 1, one end of a bank of vertically extending tubes 1, arranged in spaced parallel relationship, are shown with their ends secured into and extending through a tube sheet 2. Though not shown, the lower ends of the tubes 1 are secured within a similar tube sheet. Spaced below and in substantially parallel relationship with the upper tube sheet 2 is a plate member 3 with closely fitting openings for the tubes and containing a plurality of openings 4, 5, 6, arranged in rows, as illustrated in FIG. 2, and spaced between adjacent rows of the tubes. A similar plate can be positioned at the lower ends of the tubes in closely spaced relationship from the lower tube sheet.

Figure 3:
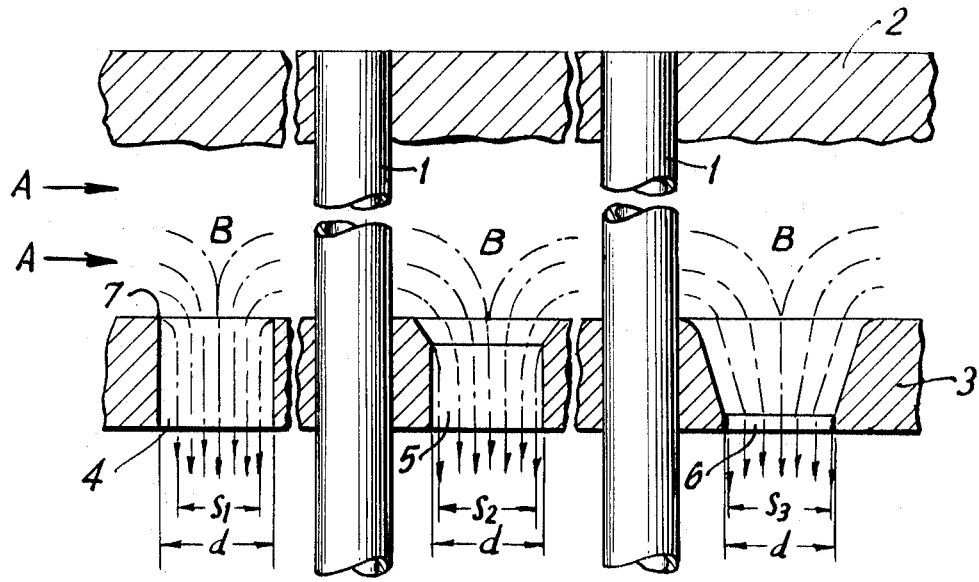
FIG. 3 is an enlarged partial sectional view of the heat exchanger shown in FIG. 1.

Though not shown in the drawing, an enclosing wall or vessel is disposed about the bank of tubes and in combination with the tube sheet 2 and the plate member 3 forms an inlet space for supplying a fluid medium for passage over the exterior of the tubes 1. In FIGS. 1, 2 and 3, the arrows A indicate the direction of flow of the fluid medium into the space between the tube sheet and the plate member, that is, transverse to the axial directions of the tubes. The arrows B indicate the direction of flow of the fluid medium from the inlet space through the openings 4, 5 and 6 and over the tubes. As the fluid medium flows through the inlet space transversely across the plate member 3, the pressure at the entrances to the openings 4, 5 and 6 will be reduced in relationship to the length of the flow path within the inlet space. The openings 4, 5 and 6 are arranged in rows extending transversely of the direction of the inlet flow A and the pressure conditions at the entrances to the openings in the transverse rows can be assumed to be uniform across the plate member. The adjacent transverse rows of openings are arranged in staggered relationship as are the adjacent rows of tubes extending in the same direction. Since the pressure conditions in adjacent rows are considered to be closely related the openings in each pair of successive rows have been combined for purposes of providing similarly shaped passages. While the openings in each group have the same cross-sectional form, they differ from group to group.

In FIG. 3, the configuration of individual openings in each of the group of openings 4, 5 and 6 are shown on an enlarged scale. Each of the openings 4, 5 and 6 has the same minimum cross-sectional size or diameter $d$ at its exit end. This same size or diameter exists for at least a portion of the axial length of the opening from its exit end. The openings 4, shown in FIG. 2 are the first two rows of openings to encounter the fluid medium and, therefore, having the highest pressure at their entrances, have the same diameter for their entire axial length. As a result, the openings 4 present a sharp entrance edge 7 to the flow of the fluid medium entering the openings and the jet cross section $s_1$ for the openings is considerably reduced as compared to the diameter of the opening at its exit end.

The openings 5, the second pair of rows of openings to encounter the fluid medium as it flows over the plate member 3, have a reduced pressure at their entrances compared to that at the openings 4. The opposite sides of the openings for a short distance from the entrance end have a funnel-shape, diverging outwardly from the diameter $d$ or minimum cross-sectional size of the openings. Since the funnel-shaped or diverging sides of the openings are of a relatively short axial length the jet cross section $s_2$ is somewhat larger than that of the jet cross section $s_1$ for the openings 4.

The third pair of rows of openings 6, which are located the furthest distance from the inlet of the fluid medium, have the lowest pressure at the entrances. As indicated previously, these tubes 6 have the same diameter at their exit ends as the tubes 4 and 5, however, the opposite surfaces of the openings for the greater portion of their axial length are in diverging relationship from the end having the minimum cross-sectional size to the entrance end. As a result, the jet cross section $s_3$ is almost the same as the diameter $d$ at the exits from the openings 6 and is greater than the corresponding jet cross sections at the exits from the openings 5 and 4.

Because of their location relative to the flow A of the fluid medium over the plate member 3, the pressure and the velocity of the fluid medium is greatest at the openings 4 as compared to the openings 5 and 6. However, by varying the configuration of the openings at their entrance ends and maintaining a uniform minimum cross section or diameter $d$ at the exit ends of the openings it is possible to adjust the jet cross sections $s_1$, $s_2$, $s_3$ so that the quantity of fluid medium flowing through each of the openings is maintained uniform.

Further, the arrangement of the openings can be adjusted to provide variable flow of the fluid medium through the openings in accordance with the flow required over the different rows of tubes within the tube bank.

In FIG. 3, the configuration of the entrances to the openings 4, 5 and 6 has been exaggerated to illustrate the inventive concept. Actually only slight differences in the arrangement of the walls of the openings are required to adjust for the slight pressure head differences which exist at the entrances. By varying the configuration at the entrances to only a small degree the slight correction of the coefficient of resistance necessary to adjust the flow of the fluid medium through the openings can be achieved. The differences in the pressure head at the entrances to the openings can be easily calculated and, moreover, a very practical advantage is gained in the use of the same drilling tool for drilling all of the passages or openings and then the variation of the entrance surfaces to the openings can be easily accomplished as by burring, smoothing, or spot facing for the control of the coefficient of resistance through the openings.

Figure 4:
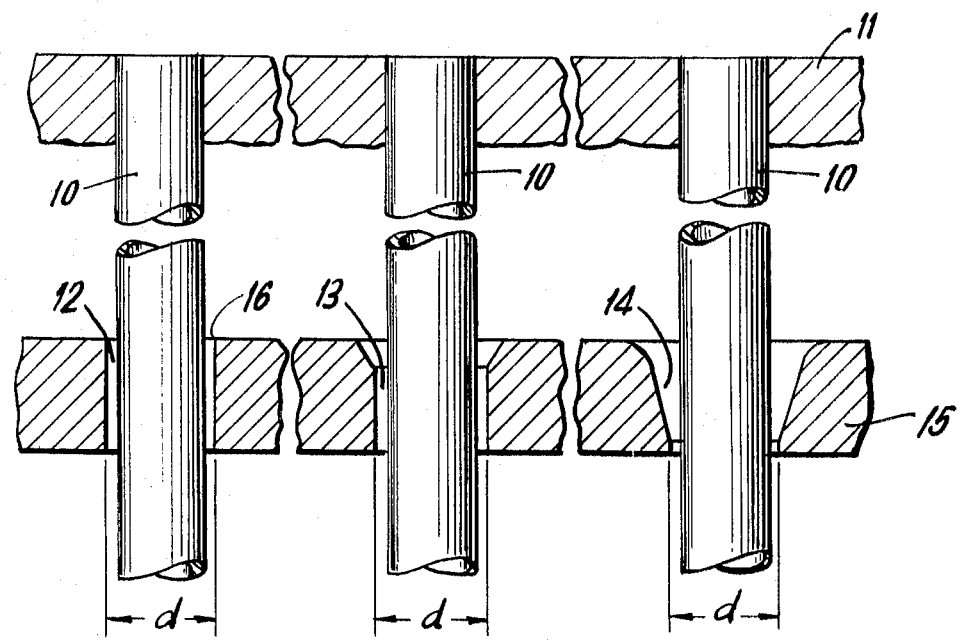
FIG. 4 is a partial longitudinal sectional view of an alternate heat exchanger arrangement embodying the present invention.

In FIG. 4, another heat exchanger, similar to the one illustrated in FIG. 3, is shown with a bank of vertically extending tubes 10 arranged in spaced parallel relationship disposed between an upper tube sheet 11 and a lower tube sheet, not shown. The openings to the tubes 10 are located at the upper face of the tube sheet 11. Spaced below and a relatively close distance from the lower face of the tube sheet 11 is a distributor plate 15 having a plurality of openings 12, 13 and 14 disposed concentrically about the tubes 10. Each of the openings has a cross-sectional dimension or dimensions greater than the outside diameter of the tubes so that an annular flow space is provided between the walls of the openings and the surfaces of the tubes. Similar to the openings 4, 5 and 6, shown in FIG. 3, the openings 12, 13 and 14 in FIG. 4, each have a minimum cross-sectional size or diameter $d$ at the exit end of the opening, that is, the end spaced further away from tube sheet 11.

In FIG. 4, the direction of flow of the fluid medium passing through the space between the tube sheet 11 and the plate member 15 is the same as that shown in FIG. 3, that is, the direction of flow being from the left to the right. As a result, the pressure of the fluid medium is highest at the opening 12 and diminishes gradually toward the openings 13 and 14 in that order. To compensate for the reduction in the pressure head at the entrance to the openings 13 and 14 a portion of the wall surfaces of the openings are arranged in diverging relationship from the location of the minimum cross-sectional size to vary the jet cross section of the fluid medium passing through the openings. In opening 12 the opposite wall surfaces are in parallel relationship for their entire axial length thereby providing a right angle edge 16 at the entrance to the opening so that the jet cross section is considerably reduced relative to the minimum diameter of the opening, which, of course, is the diameter for the entire axial length of the openings 12. Since the pressure at openings 13 is, relative to openings 12, somewhat less and relative to openings 14 somewhat greater the funnel-shape or diverging relationship of its opposite walls extends only for a relatively small portion of its axial length at the entrance to the opening. However, the opening 14, because it has the least pressure at its entrance, has the funnel-shaped configuration of its opening extending for the major portion of its axial length with only the walls at the exit being arranged in parallel relationship. Again it should be mentioned that the configuration of the openings 13 and 14 is exaggerated for purposes of illustrating the inventive concept and the differences in configuration of the openings is actually quite slight.

Figure 5:
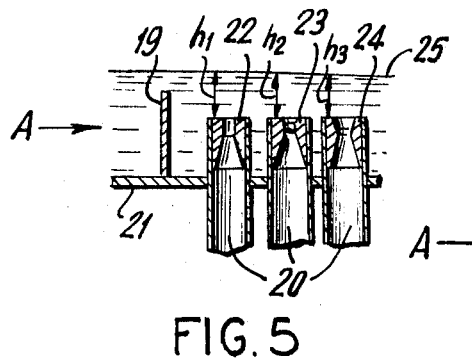
FIG. 5 is a partial longitudinal sectional view of another embodiment of the present invention taken along line V–V of FIG. 6.
Figure 6:
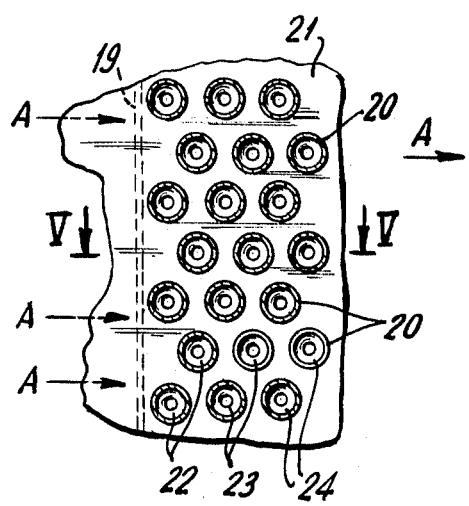
FIG. 6 is an end view of the heat exchanger illustrated in FIG. 5.

In FIGS. 5 and 6, another embodiment of the invention is shown with the fluid medium being directed into the tubes rather than through openings about the tubes. A bank of vertically disposed tubes 20, disposed in spaced parallel relationship, are secured within and extend through a tube sheet 21 with their entrances spaced upwardly from the face of the tube sheet. A wall 19, acting as weir, extends upwardly from the tube sheet 21 to a point spaced above the entrances to the tubes 20. The fluid medium flows in the direction of the arrow A that is, from the left to the right flowing over the wall 19 before reaching the entrances to the tubes 20. As shown in FIG. 6, the tubes 20 are arranged in parallel spaced rows extending transversely to the axis of flow and in generally parallel relationship with the wall 19. In the entrances of the tubes arranged in different rows, plugs 22, 23, 24 are positioned for regulating the flow of the fluid medium into the tubes. The fluid medium is indicated by a liquid level 25 disposed above the top of the wall 19 and spaced upwardly from the entrances to the tubes 20. At the tubes 20 having the plugs 22 the liquid level 25 is at a height $h_1$ above the entrance to the tubes and as the liquid level extends from the wall 19, the height above the entrance to the tubes 20 decreases. Accordingly, the height $h_2$ between the liquid level 25 and the tubes containing the plugs 23 is less than the height $h_1$. Similarly, the tubes containing the plugs 24 located the furthest distance from the wall 19, have the lowest height $h_3$ of the liquid level above the plugs.

The configuration of the openings or bores through the plugs are determined by the dynamic pressure heads $h_1$, $h_2$, $h_3$ at the entrances to the tubes. Each of the plugs 22, 23, 24 has a bore therethrough with the same minimum cross-sectional size intermediate its entrance and exit. The two rows of tubes 20, disposed closest to the wall 19, have the plugs 22 and the walls of the bore in these plugs extending from the entrance have the minimum cross-sectional size so that the opposite surfaces are in parallel relationship. In the next two rows spaced from the wall 19, the tubes have plugs 23 and the entrances to the plugs have wall surfaces in diverging relationship for a short distance from the entrance to the portion having the minimum cross-sectional size. The last two rows disposed the greatest distance from the wall 19 have the opposing surfaces in diverging or funnel-shaped configuration for a greater distance than that in the plugs 23. As with the arrangement previously described, by providing a variable funnel-shape to the walls in the plugs 23, 24 the flow through the bores of the plugs can be regulated in relationship to the pressure heads $h_1$, $h_2$, $h_3$ at the entrances to the tubes.

At the opposite or exit ends of the bore through the plugs a diffuser type enlargement is provided from the location having the minimum cross-sectional size extending to the exits from the tubes. The enlargements at the exit ends of the plugs can be of different designs or arrangements, if necessary, to influence the coefficient of resistance through the plugs for achieving any desired distribution of the flow medium through the tubes 20.

Basically, the invention has been described where a uniform distribution of the fluid medium through the openings or passages is desired, however, it can be appreciated that, by properly shaping the flow passages, an irregular distribution of the fluid medium can be attained as may be required in view of the conditions within the heat exchanger or other equipment containing the tubes.

I claim:

1. A method of distributing and regulating flow of a fluid medium through a multiplicity of axially extending openings in a platelike member each opening having an entrance end spaced axially from an exit end, comprising the steps of providing each opening with the same transverse cross-sectional diametrical size at a location spaced axially from its entrance end, based on the variable pressure distribution at the entrance ends of the openings selectively arranging the transverse cross-sectional diametrical size of each of the openings from the location of its minimum cross-sectional diametrical size to its entrance end varying between the diametrically opposed surfaces being in parallel relationship and the diametrically opposed surfaces being in diverging relationship for establishing selected jet cross sections of the fluid medium through the openings in respect to the pressure at the entrance of each opening and the coefficient of total resistance.

2. A device for proportioning the flow of the fluid medium through a plurality of openings, comprising a perforate plate member having a plurality of laterally spaced axially extending openings therethrough, each of said openings having an entrance end spaced axially from an exit end, each said opening having the same minimum cross-sectional diametrical size at least at a position spaced axially from the entrance end of the opening, and the diametrical dimensions of the entrance ends of the openings being arranged in relationship to the differences in fluid medium pressure at the entrance ends to the openings with the opening where the pressure at the entrance end is at a maximum being disposed in parallel relationship from the location of the minimum cross-sectional diametrical size to the entrance end thereof, and where the pressure at the entrance ends to the openings if less than the maximum pressure the diametrically opposed surfaces from the location of the minimum cross-sectional diametrical size to the entrance ends being disposed in diverging relationship of increasing axial lengths in direct relationship to the difference in the pressure at the entrance end of the opening from the maximum pressure at the entrance ends to said openings.

3. A device for proportioning the flow of a fluid medium comprising a tube sheet, a bank of tubes arranged in laterally spaced relationship and secured into and passing through said tube sheet with the openings of said tubes located on one face of said tube sheet, a plate member disposed in substantially parallel relationship with and closely spaced from the other face of said tube sheet with said tubes passing through said plate member, said plate member having a plurality of openings therethrough extending in generally parallel relationship with said tubes, the space between said tube sheet and said plate member being adapted to form an inlet passageway for supplying a fluid medium for flow through the openings in said plate members for passage over said tubes, each of the openings having an entrance thereto on said tube sheet side of said plate member, each of the openings through said plate member having the same minimum transverse cross-sectional size at least at a location axially spaced from the entrance thereto, and the opposite surfaces of said openings extending between the location having the minimum cross-sectional size and the entrance thereto varying between parallel and diverging relationship in relationship to the pressure of the fluid medium at the entrances thereto so that said openings having the maximum pressure of the fluid medium at the entrances having the opposite surfaces of the openings disposed in parallel relationship and the sides of the other said openings having less than the maximum pressure at the entrances thereto being in diverging relationship for an axial length of the openings in direct relationship to the difference between the pressure at the entrance to the opening and the maximum pressure of the fluid medium to said openings.

4. A device, as set forth in claim 3, wherein the minimum cross-sectional size of the openings extends from a location spaced from the entrances thereto to the exits from the openings.

5. A device, as set forth in claim 3, wherein said tubes are arranged in rows extending transversely to the direction of flow of the fluid medium across said plate member, said openings are arranged in rows extending transversely to the direction of flow of the fluid medium across said plate member, and the rows of said openings being disposed in parallel relationship with the rows of said tubes and being disposed in staggered relationship between said tubes.

6. A device, as set forth in claim 3, wherein said tubes are arranged in rows disposed transversely of the direction of flow of the fluid medium across said plate member and said openings being disposed concentrically about said tubes with the sides of said openings disposed in spaced relationship from said tubes for forming an annular flow space therebetween.

7. A device, as set forth in claim 3, wherein the surfaces of said openings are disposed in diverging relationship from the locations of the minimum cross-sectional size to the exits therefrom.

8. A device, for proportioning the flow of a fluid medium comprising a tube sheet, a bank of tubes arranged in laterally spaced relationship and extending through said tube sheet with the entrance ends of said tubes spaced axially from one face of said tube sheet and the exit ends of said tubes spaced from the opposite face of said tube sheet, a wall attached to the one face of said tube sheet and extending therefrom outwardly beyond the entrance ends of said tubes, the one face of said tube sheet adapted to form a flow surface for conducting a fluid medium to the entrance ends of said tubes with the fluid medium flowing over said wall acting as a weir, and plugs positioned within the entrance ends of said tubes for regulating flow through said tubes, each of said plugs having an axially extending bore therethrough and each bore having the same minimum transverse cross-sectional size at a location spaced from the entrance ends of said tubes.

9. A device, as set forth in claim 8, wherein said tubes spaced closest to said wall having the maximum head of fluid medium above the entrance ends thereof and having the opposite sides of the bores thereof disposed in parallel relationship forming a continuation of the minimum cross-sectional size of the bore.

10. A device, as set forth in claim 9, wherein the opposite surfaces of the bores of said plugs, located in said tubes spaced further away from said wall than said tubes having the maximum head above the entrances thereto, extending from the locations of the minimum cross-sectional sizes to the entrances being in diverging relationship and the axial length of the diverging relationship being in direct relationship to the difference in the pressure at the entrances compared to the maximum pressure at the entrances to said plugs adjacent said wall.

11. A device, as set forth in claim 8, wherein the exits from said bores through said plugs being in diverging relationship from the locations of said minimum cross-sectional sizes.

12. A device, as set forth in claim 11, wherein the axial length of the diverging sides at the exit ends of the bores through said plugs being varied to influence the flow distribution of the fluid medium through said tubes.